INVENTORS
HELMUT UEBERWASSER
& ROGER UEHLINGER

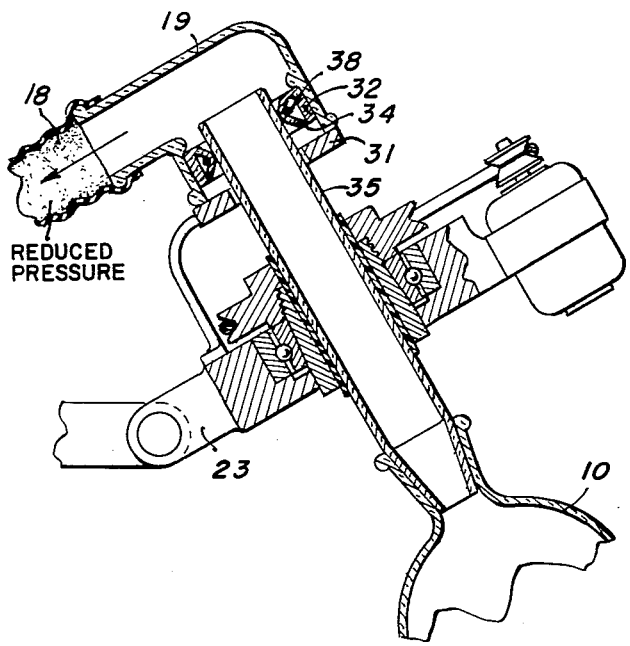
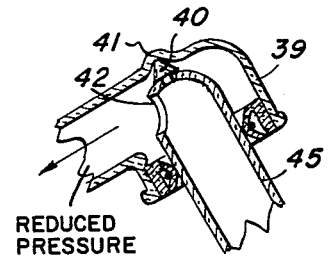
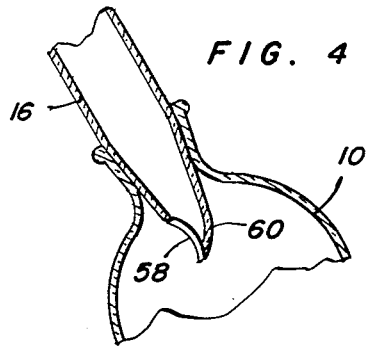
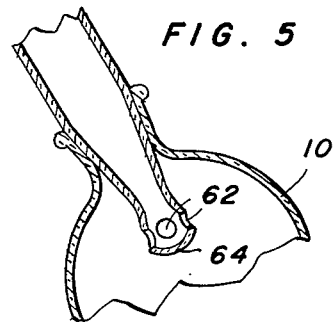
INVENTOR
**HELMUT UEBERWASSER
& ROGER UEHLINGER**

United States Patent Office 3,034,573
Patented May 15, 1962

3,034,573
ROTARY EVAPORATORS
Helmut Ueberwasser, Riehen, and Roger Uehlinger, Basel, Switzerland, assignors to Ciba Limited, Basel, Switzerland
Filed Mar. 28, 1958, Ser. No. 724,745
Claims priority, application Switzerland Mar. 29, 1957
12 Claims. (Cl. 159—6)

This invention provides an improved rotary evaporator, and more especially a vacuum rotary evaporator suitable for laboratory use.

Rotary evaporators are often used for evaporating solutions which need careful treatment, more especially, to ensure that the temperature on the external wall of the distillation vessel is not appreciably higher than the temperature at which the solvent is to be evaporated.

The present invention provides an especially simple construction of rotary evaporator. The rotary evaporator of this invention comprises a tube of large internal diameter rotatably mounted on its external surface, driving means for rotating said tube, a vessel containing the material to be distilled, and a vacuum off-take conduit floatingly but non-rotatably mounted so that it may adapt itself to displacement of the upper tube end but does not take part in its rotation, and an annular packing member of elastic material between off-take conduit and upper tube end to insure a sufficiently tight seal.

Figure 1:
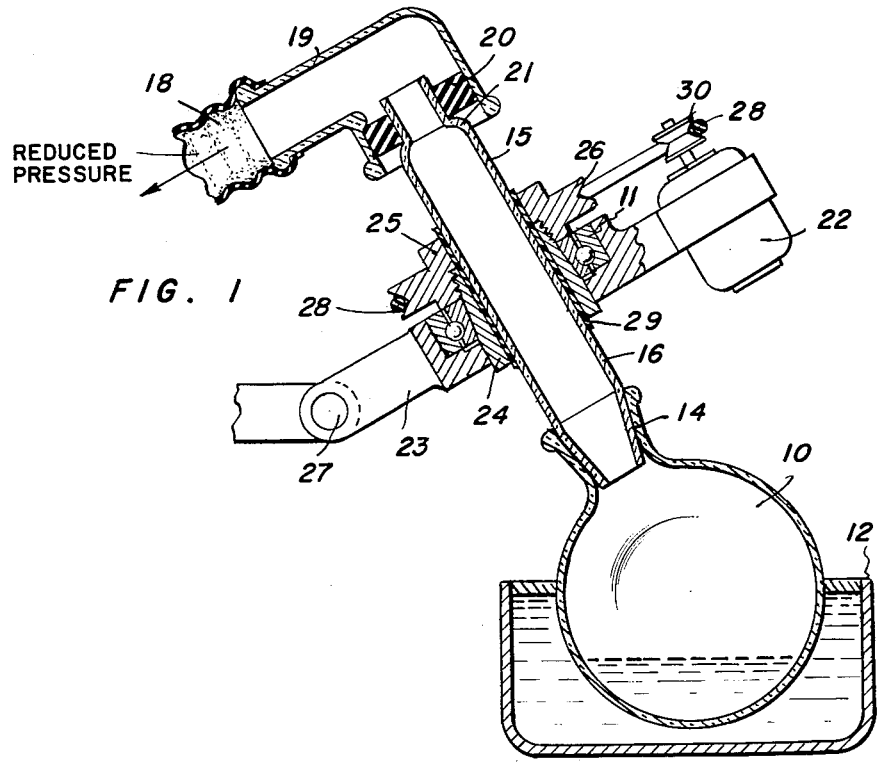
Figure 6:
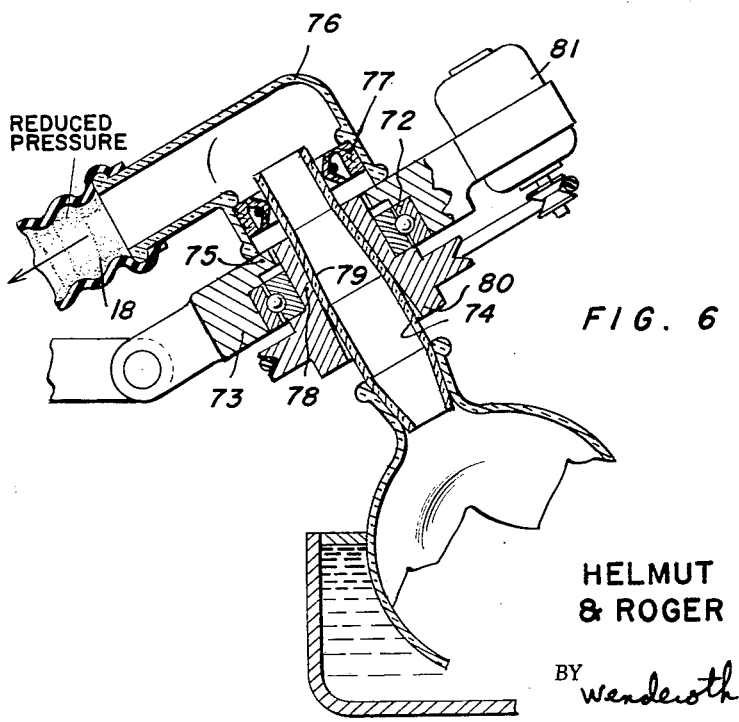

Examples of apparatus constructed in accordance with the invention are shown in the accompanying drawings in which FIG. 1 shows in cross-sectional side elevation a rotary evaporator constructed in accordance with the invention, FIG. 2 shows a modified form of connection for the suction conduit, FIG. 3 shows another form of connection for the suction conduit, and FIGS. 4 and 5 show two forms of construction of the lower end of the evaporation tube extending into the distillation vessel, and FIG. 6 shows a further construction of connection for the suction conduit and of means for mounting the evaporation tube.

The rotary evaporator shown in FIG. 1 has a distillation vessel 10, which contains the liquid to be evaporated and is immersed, for example, in the water bath 12. The distillation vessel 10 is advantageously connected to the lower end of the tube 16 by means of a conically mounted glass connection 14. In accordance with the invention the tube 16 has a large internal diameter and is mounted for rotation about its axis in a bearing 11. The tube is so wide as to offer no resistance to the free flow of the vapors passing from the distillation vessel to the take-off conduit. On the upper end of the tube a suction conduit is floatingly, but non-rotatably mounted in such manner that it may adapt itself to any shifting displacement or misalignment of the upper tube end, but does not rotate with the tube. As shown the suction conduit consists of a headpiece 19 and a flexible or rigid pipe with position adaptor, i.e. a ground ball and socket joint, 18 fitted to the headpiece. In accordance with the invention the tube 16 is connected to the suction conduit by means of a packing 20 of elastic material which is placed on the external surface of the tube and does not rotate with the tube.

The suction tube is floatingly mounted on the tube, that is to say, the headpiece 19 is held in positions by the tube, but does not rotate with the tube.

The tube 16 is driven by a motor 22. As shown in the drawing the tube 16 is supported in the bearing 11 by means of an externally conical bush 24, which is a clamping sleeve of hard plastic material or metal and has an intermediate layer of plastic or leather 29 interposed between it and the tube, and the tube is firmly clamped by the action of a coupling nut 25. The coupling nut is also provided with a pulley groove 26, in which runs a driving belt 28 which is driven by a pinion 30 on the motor 22. If desired, there may be inserted between the pinion 30 and the pulley groove 26 an intermediate gearing for reducing and/or adjusting the rate of revolution of the tube 16. The motor 22 is fixed to an outer frame 23, which carries the bearing 11, so that the whole apparatus can be fixed as a unit, for example, to a stand, for example, with the interposition of a hinge 27. The bearing 11 is constructed as an anti-friction bearing, for example, a ball bearing, roller bearing or needle bearing. It will be understood, however, that the bearing may be of any other construction which has a sufficiently large internal diameter to accommodate a tube of the requisite large diameter. Advantageously, the bearing is located approximately at the center of gravity of the tube and distillation vessel, taking into account the contents of the vessel and its buoyancy, so that only small tilting or turning forces are exerted on the apparatus.

The packing between the rotary tube 16 and the stationary conduit leading to the condenser or source of vacuum is formed by the annular packing 20. As shown in FIG. 1 this annular packing rests loosely on a shoulder 21 of the tube. This shoulder takes the axial pressure of the headpiece 19 due to the external pressure acting upon the latter by virtue of the reduced pressure within it, so that there is an efficient connection between the headpiece 19 and the tube 16.

In FIG. 2 is shown a slightly modified construction in which the headpiece 19 is not supported by the rotary tube, but is supported on a supporting ring 31 fixed to the frame 23, so that the ring 31 does not rotate with the tube. As compared with the construction shown in FIG. 1, it is not necessary to reduce the diameter of the tube at its upper end, and the internal diameter of the upper end of the tube is the same as that of the body of the tube. In this construction there is also provided a modified packing ring 32. The packing ring 32 has a lip-shaped inner edge 34, which is pressed by means of an annular spring 38, for example, a spiral spring, against the external surface of the rotary tube 35, in order to secure satisfactory packing. In this construction also the suction conduit is floatingly but non-rotatably mounted on the tube, since the supporting ring 31 serves only to absorb the force exerted by the downward pressure of the headpiece 19, and does not restrain the headpiece 19 in any other way.

In FIG. 3 is shown a further modification, in which the headpiece 39 is supported on a pivoted point 40 provided on the tube 45. The headpiece 39 has a corresponding recess 41 in which the pivot point 40 rotates. The exit from the tube 45 is constituted by a lateral opening 42. Advantageously, the pivot point 40 is not formed integrally with the tube 45, but consists of metal or other material forming a good bearing surface with glass. The pivot point is inserted into the upper end of the tube, which is narrow as little as possible. Alternatively, the pivot point may be fixed, for example, on two crossed pieces of sheet metal which are inserted lengthwise into the tube. These pieces of sheet metal carry the pivot point. Such a point bearing considerably reduces the friction caused by supporting force, as compared with the construction shown in FIG. 1. Furthermore, the provision of a separate supporting ring, as shown in FIG. 2, becomes unnecessary.

In FIGS. 4 and 5 are shown two ways of forming the end of the tube that projects into the distillation vessel. With certain substances, which have a tendency to spatter during evaporation, it is necessary to prevent residues from the distillation vessel being ejected through the tube, whereby they would reach the condenser or be lost. For this purpose the opening at the lower end of the tube is so constructed that vapour is constrained to enter the tube in a lateral direction. For example, in the form shown in FIG. 4 a single lateral opening 58 is provided in a tapered portion 60 of the tube that projects into the distillation vessel. In the construction shown in FIG. 5 a plurality of lateral openings 62 are provided at the end of the tube which similarly projects into the distillation vessel.

A further form of the invention is illustrated in FIG. 6. In contradistinction to the construction shown in FIG. 2, the ball bearing 72 is inserted into the frame 73 from the underside of the latter, so that the upper side of the frame has a flange 75 that projects inwardly almost up to the tube 74. The take-off tube 76 is supported against axial pressure caused by the vacuum directly on the upper surface of the frame 73. The packing is constituted by a packing member 77 provided in the interior of the tube 76, which packing member rests on the external surface of the tube 74 as in the other constructions. The tube 74 projects only to a small extent above the bearing surface of the frame 73, in other words, only to an extent sufficient to provide an adequate bearing surface for the packing member 77. The tube 76 is, as in the previous constructions, centered on the tube 74 by means of the packing member 77, and it is free to slide laterally on the surface of the frame 73 in order to respond to inaccuracies in the circular form of the tube 74. Thus, the tube 76 is floatingly mounted on the external surface of the tube, as in the other constructions. This construction also enables the tube 74 to be fixed in the ball bearing 72 in a very simple manner. A bush 78 is pressed into the inner ring of the ball bearing 72. At its inner end this bush 78 carries on its underside a pulley groove 80 whereby the bush is driven by the motor 81. The bush 78 also has a slightly conical bore which widens a downward direction, that is to say, towards the distillation vessel. The tube 74 has a corresponding conical portion 79 of which the outer surface fits within the inner conical surface of the bush 78. When the apparatus is put into operation the tube 74, with the distillation vessel connected thereto, is pushed upwardly into the bush and after placing the suction tube 76 in position, reduced pressure is established.

The apparatus of this invention has important advantages. In the first place, the use of a straight tube of large internal diameter has a favorable effect on the efficiency of the evaporation. The tube can be cleaned and rinsed out without great difficulty. The bearing for the tube, which also supports the distillation vessel, provides a very simple and robust construction, so that the entire arrangement together with the driving motor forms a single rigid construction, which can be very simply supported in any desired manner. This is made possible due to the fact that the flexible conduit leading to the condenser is floatingly supported on the tube and carried thereby. The arrangement does not necessitate a separate support for the suction conduit nor any complicated or sensitive adjustments or alignment between the tube and the suction conduit. The packing resting on the external surface of the tube constitutes a very simple but reliably tight connection. The fact that the packing rests only on the external surface of the tube has the advantage that any substance, such as fat, etc., used for sealing purposes, or material abraded from the tube or packing, cannot enter the distillation vessel.

Such an arrangement also enables an additional tube to be inserted from the exterior. By means of such a tube further material can be supplied to the distillation vessel, so that the evaporation can be carried out in a continuous manner. Such a tube may also serve to introduce a current of inert gas or vapor in which the evaporation is to be carried out. Supporting the whole apparatus, including the driving means, on a common support enables the axis of rotation of the tube and distillation vessel to be adjusted at any desired angle. Thus, for example, by making the axis of rotation substantially horizontal an extremely small head of vapor pressure and consequently very mild distillation conditions are achieved.

What is claimed is:

1. A vacuum rotary evaporator comprising a glass vessel having an aperture therein; a straight tube made of non-machined glass tubing and having an upper and a lower end and an opening at each end and having throughout its entire length a bore free from internal obstructions and of a diameter approximating that of the aperture in the vessel, said tube being detachably secured to said vessel, the opening at the lower end of the tube communicating with the aperture in the vessel; tube-rotating means engaging said tube on its external surface, a non-rotating vapor off-take connected to the opening at the upper end of the tube, a vacuum source, an elastic vacuum tube between said vacuum source and said vapor off-take, and an annular packing member of elastic material between the off-take and the external surface of the tube exclusively below the opening of the latter at the upper end thereof, said non-rotating vapor off-take being thereby floatingly connected to the upper end of said tube so that said off-take can adapt itself to lateral displacement of the rotating tube, while maintaining a sufficiently tight sealing effect of said packing member at all times, whereby contamination of the vapors leaving through said off-take with substance from said packing member is substantially avoided.

2. A rotary evaporator as claimed in claim 1 wherein said tube-rotating means comprises an anti-friction bearing.

3. A rotary evaporator as claimed in claim 2, wherein said tube-rotating means comprise driving means located so as to exert its driving force to the tube in the vicinity of the bearing in which the tube is mounted.

4. A rotary evaporator as claimed in claim 2 wherein said tube-rotating means further comprises a stationary member and a rotatable member, said anti-friction bearing being mounted therebetween, said rotatable member having a central conical bore, and wherein the tube is formed with an externally conical portion which fits within in said conical bore in said rotatable member, and the said off-take is cup-shaped and bears with its rim against said stationary members, the conical portion of the tube being thereby maintained within the said conical bore under the action of reduced pressure within the off-take.

5. A rotary evaporator as claimed in claim 1, wherein the tube has a shoulder at its outer end against which the packing means bears in the axial direction of the tube under the action of reduced pressure within the off-take.

6. A vacuum rotary evaporator assembly comprising a glass vessel having an aperture therein; a straight tube made of non-machined glass-tubing having an opening at each end and having throughout its entire length a bore free from internal obstructions and of a diameter approximating that of the aperture in the vessel, said tube being detachably secured to said vessel, the aperture of the latter communicating with one of said tube openings; stationary supporting means; tube-rotating means mounted on said supporting means and supportingly engaging said tube at the external surface of the latter intermediate said tube openings; a non-rotating vapor off-take floatingly connected to the other opening of said tube and displaceable relative to said supporting means, resilient annular packing means between the off-take and the external surface of the tube, and conduit means for maintaining reduced pressure within said off-take, thereby effecting tight sealing of said packing means against said off-take and said tube independently of radial displacement of the rotating tube relative to said off-take.

7. A vacuum rotary evaporator assembly comprising a glass vessel having an aperture therein; a straight tube made of non-machined glass tubing having an opening at each end and having throughout its entire length a bore free from internal obstructions and of a diameter approximating that of the aperture in the vessel, said tube being detachably secured to said vessel, the aperture of the latter communicating with one of said tube openings; stationary supporting means; driving means mounted on said supporting means; transmission means attached to said tube at the external surface thereof intermediate said tube openings and rotatably mounted in said supporting means, said transmission means engaging said driving means, a non-rotating vapor off-take floatingly connected to the other opening of said tube and displaceable relative to said supporting means, resilient annular packing means between the off-take and the external surface of the tube, and conduit means for maintaining reduced pressure within said off-take, thereby effecting tight sealing of said packing means against said off-take and said tube independently of radial displacement of the rotating tube relative to said off-take.

8. A vacuum rotary evaporator assembly comprising a glass vessel having an aperture therein, a straight tube made of non-machined glass tubing having an opening at each end and having throughout its entire length a bore free from internal obstructions and of a diameter approximating that of the aperture in the vessel, stationary supporting means, said tube being detachably secured to said vessel, the aperture of the latter communicating with one of said tube openings, means for rotating said tube being mounted on said supporting means, and engaging said tube at its external surface intermediate said tube openings, a non-rotating vapor off-take floatingly connected to the other opening of said tube, resilient annular packing means between the off-take and the external surface of the tube, said off-take being supported on said supporting means against the action of pressure exerted by said off-take in the axial direction of the said tube under the action of reduced pressure within said off-take, and in such a manner as to be displaceable radially relative to said tube, and conduit means for maintaining reduced pressure within said off-take, thereby effecting tight sealing of said packing means against said off-take and said tube independently of radial displacement of the rotating tube relative to said off-take.

9. A vacuum rotary evaporator comprising frame means; an evaporating vessel made of glass having an aperture therein; a straight tube made of non-machined glass tubing having an upper and a lower end and an opening at each end and having throughout its entire length a bore free from internal obstructions and of a diameter approximately that of the aperture in said vessel; said tube being detachably secured to said vessel, the opening at the lower end of said tube coinciding with the aperture in said vessel; transmission means attached to the external surface of said tube near the central zone thereof, and mounted in said frame means for rotation therein about a central axis; driving means mounted on said frame means and engaging said transmission means; a vapor take-off head enclosing the upper end of said tube; a vacuum source; an elastic vacuum tube between said vacuum source and said vapor take-off head, the opening at said upper tube end being in free communication with the interior of said head; and packing means of elastic material between said head and said tube and sealingly engaging the latter exclusively at a zone below said opening at said upper tube end, thereby floatingly connecting said take-off with said upper tube end and insuring a sufficiently tight seal independently of displacement of the rotating tube.

10. A vacuum rotary evaporator comprising frame means; an evaporating vessel made of glass having an aperture therein; a straight tube made of non-machined glass tubing having an upper and a lower end and an opening at each end and having throughout its entire length a bore free from internal obstructions and of a diameter approximately that of the aperture in said vessel, said tube being detachably secured to said vessel, the opening at the lower end of said tube coinciding with the aperture in said vessel; transmission means attached to the external surface of said tube near the central zone thereof, and mounted in said frame means for rotation therein about a central axis; driving means mounted on said frame means, and engaging said transmission means; a vapor take-off head enclosing the upper end of said tube; a vacuum source; an elastic vacuum tube between said vacuum source and said vapor take-off head, the opening at said upper tube end being in free communication with the interior of said head; packing means of elastic material between said head and said tube and sealingly engaging the latter exclusively at a zone below said opening at said upper tube end, thereby floatingly connecting said take-off with said upper tube end, and insuring a sufficiently tight seal independently of displacement of the rotating tube; and pivot means attached to the upper end of said tube, said head having a wall portion adapted for being supported by said pivot means and centering the latter during its rotation.

11. A vacuum rotary evaporator comprising frame means; an evaporating vessel made of glass having an aperture therein; a straight tube made of non-machined glass tubing having an upper and a lower end and an opening at each end and having throughout its entire length a bore free from internal obstructions and of a diameter approximately that of the aperture in said vessel, said tube being detachably secured to said vessel, the opening at the lower end of said tube coinciding with the aperture in said vessel, transmission means attached to the external surface of said tube near the central zone thereof, and mounted in said frame means for rotation therein about a central axis; driving means mounted on said frame means, and engaging said transmission means; a vapor take-off head enclosing the upper end of said tube; a vacuum source; an elastic vacuum tube between said vacuum source and said vapor take-off head, the opening at said upper tube end being in free communication with the interior of said head; and packing means of elastic material between said head and said tube and sealingly engaging the latter exclusively at a zone below said opening at said upper tube end, thereby floatingly connecting said take-off with said upper tube end and insuring a sufficiently tight seal independently of displacement of the rotating tube; said frame means being adapted for supporting said head, so as to relieve pressure of the latter on said packing means, while permitting said head to follow deviations of said upper tube end from the central axis of said transmission means and simultaneously preserving effective sealing by said packing means.

12. A vacuum rotary evaporator assembly comprising a vessel having an aperture therein, glass connecting means integral with said vessel and bearing a ground-in connecting surface about said aperture, a straight tube made of non-machined glass tubing having an opening at each end and having throughout its entire length a bore free from internal obstructions and of a diameter approximating that of the aperture in the vessel, and having at one tube end a ground-in connecting surface for sealing engagement with said connecting surface of said vessel, whereby said tube is detachably secured to said vessel; stationary supporting means; tube-rotating means mounted on said supporting means and supportingly engaging said tube at the external surface of the latter intermediate said tube openings, a non-rotating cup-shaped vapor off-take floatingly connected to and enclosing the other opening of said tube and radially displaceable relative to said tube-rotating means and of an inner diameter wider than the outer diameter of said tube, resilient annular packing means between the off-take and the external surface of the tube and substantially exclusively extending in a plane transverse to the axis of said tube and conduit means for maintaining reduced pressure within said off-take thereby effecting tight sealing of said packing means against said off-take and said tube independently of radial displacement of the rotating tube relative to said off-take.

References Cited in the file of this patent

UNITED STATES PATENTS

| | | |
|---|---|---|
| 2,575,688 | Smith | Nov. 20, 1951 |
| 2,797,747 | Rinderer | July 2, 1957 |
| 2,865,445 | Buchler | Dec. 23, 1958 |